United States Patent
Khan et al.

(10) Patent No.: US 10,301,218 B1
(45) Date of Patent: May 28, 2019

(54) LOW CEMENT CONTENT STRAIN-HARDENING CEMENTITIOUS COMPOSITE

(71) Applicant: KING SAUD UNIVERSITY, Riyadh (SA)

(72) Inventors: Mohammad Iqbal Khan, Riyadh (SA); Galal Fares, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/125,627

(22) Filed: Sep. 7, 2018

(51) Int. Cl.
| | |
|---|---|
| *C04B 28/04* | (2006.01) |
| *C04B 14/16* | (2006.01) |
| *C04B 14/06* | (2006.01) |
| *C04B 24/32* | (2006.01) |
| *C04B 14/04* | (2006.01) |
| *C04B 16/06* | (2006.01) |
| C04B 103/32 | (2006.01) |
| C04B 111/00 | (2006.01) |

(52) U.S. Cl.
CPC ............ *C04B 28/04* (2013.01); *C04B 14/041* (2013.01); *C04B 14/06* (2013.01); *C04B 14/16* (2013.01); *C04B 16/0641* (2013.01); *C04B 24/32* (2013.01); *C04B 2103/32* (2013.01); *C04B 2111/00051* (2013.01)

(58) Field of Classification Search
CPC ......... C04B 28/04; C04B 14/16; C04B 14/06; C04B 24/32; C04B 14/041; C04B 16/0641; C04B 2103/32; C04B 2111/00051
See application file for complete search history.

(56) References Cited

U.S. PATENT DOCUMENTS

| | | | |
|---|---|---|---|
| 2003/0116063 A1 | 6/2003 | Macklin et al. | |
| 2011/0166261 A1 | 7/2011 | Lorenz et al. | |
| 2011/0259247 A1 | 10/2011 | Walenta et al. | |
| 2015/0251952 A1* | 9/2015 | Byrd | C04B 28/04 |
| | | | 106/672 |

FOREIGN PATENT DOCUMENTS

| | | |
|---|---|---|
| CN | 106116354 A | 11/2016 |
| CN | 106699058 A | 5/2017 |
| GB | 1113205 A | 5/1968 |
| KR | 20130018500 A | 2/2013 |

OTHER PUBLICATIONS

Choucha et al. "Effect of natural pozzolan content on the properties of engineered cementitious composites as repair material." Frontiers of Structural and Civil Engineering (2017): 1-9.

* cited by examiner

*Primary Examiner* — Robert D. Harlan
(74) *Attorney, Agent, or Firm* — Richard C. Litman

(57) ABSTRACT

The low cement content strain-hardening cementitious composite is cement with a natural pozzolan replacing a significant portion of the Portland cement therein. The strain-hardening cementitious composite includes a mixture of cement, fly ash, sand, a polycarboxylic ether-based superplasticizer, and reinforcing polyvinyl alcohol fibers. The mixture is formed with a low content of Portland cement (6-12 wt %) and with ground scoria as the natural pozzolan (5-20%). The sand forms at least 22 wt % of the strain-hardening cementitious composite and is preferably in the form of sieved dune sand, having a silicon dioxide concentration of between approximately 80 and 90 wt %, and a feldspar concentration of between approximately 10 and 20 wt %. The dune sand is sieved such that the sand grains have a median diameter of less than or equal to approximately 300 µm, and preferably have a median diameter of approximately 200 µm.

3 Claims, 3 Drawing Sheets

LOW CEMENT CONTENT STRAIN-HARDENING CEMENTITIOUS COMPOSITE

BACKGROUND

1. Field

The disclosure of the present patent application relates to engineered cementitious composites, and particularly to a low cement content strain-hardening cementitious composite in which a natural pozzolan replaces a portion of the Portland cement therein.

2. Description of the Related Art

In materials science, strain-hardening (also known as "work hardening") is the strengthening of a material by plastic deformation. This strengthening occurs because of dislocation movements and dislocation generation within the crystal structure of the material. In addition to metals and polymers, strain-hardening cement-based composites (SHCCs) also take advantage of strain-hardening, providing cementitious composites that exhibit strain-hardening, quasi-ductile behavior due to the bridging of fine multiple cracks by short, well-distributed fibers. The favorable mechanical properties of this material offer many possible applications in new and old structures, as well as in the strengthening and repair of structural elements made of reinforced concrete or other traditional materials.

One common form of strain-hardening cement-based composite is the polyvinyl alcohol engineered cementitious composite (PVA-ECC). A typical PVA-ECC is formed from Portland cement, fly ash, sand, a superplasticizer (also known as a "high range water reducer"; i.e., a chemical admixture used where well-dispersed particle suspension is required), and reinforcing polyvinyl alcohol (PVA) fibers. In order to make PVA-ECCs more cost effective, research is often directed towards varying the proportions of the components of the PVA-ECC or in trying to find variants for the reinforcing fibers. However, it is possible to make PVA-ECCs more cost effective, and easier to prepare, using other techniques.

Pozzolans are a broad class of siliceous or siliceous and aluminous materials which, in themselves, possess little or no cementitious value but which will, in finely divided form and in the presence of water, react chemically with calcium hydroxide at ordinary temperature to form compounds possessing cementitious properties. The benefits of pozzolan use in cement and concrete are threefold: First is the economic gain obtained by replacing a substantial part of the Portland cement by cheaper natural pozzolans or industrial by-products. Second is the lowering of the blended cement environmental cost associated with the greenhouse gases emitted during Portland cement production. A third advantage is the increased durability of the end product. It would obviously be desirable to be able to use pozzolans in the manufacture of PVA-ECCs.

However, the most commonly used pozzolans today are industrial by-products, such as fly ash, silica fume from silicon smelting, highly reactive metakaolin, and burned organic matter residues rich in silica, such as rice husk ash. Their use has been firmly established and regulated in many countries. However, the supply of high-quality pozzolanic by-products is limited and many local sources are already fully exploited. It would obviously be further desirable to be able to use a natural pozzolan in the manufacture of PVA-ECCs. Thus, a low cement content strain-hardening cementitious composite solving the aforementioned problems is desired.

SUMMARY

The low cement content strain-hardening cementitious composite is a cementitious composition in which natural pozzolan replaces a portion of the Portland cement therein. The strain-hardening cementitious composite includes a cement mixture, fly ash, sand, a polycarboxylic ether-based superplasticizer, and reinforcing polyvinyl alcohol fibers. The cement mixture is formed from a mixture of Portland cement and ground scoria as the natural pozzolan. The sand forms at least 22 wt % of the strain-hardening cementitious composite and is preferably in the form of sieved dune sand, having a silicon dioxide concentration of between approximately 80 wt % and approximately 90 wt %, and a feldspar concentration of between approximately 10 wt % and approximately 20 wt %.

The dune sand is sieved such that the sand grains have a median diameter of less than or equal to approximately 300 μm, and preferably have a median diameter of approximately 200 μm. Particles of the Portland cement each preferably have a median diameter of greater than approximately 11 μm, and grains of the ground scoria each also have a median diameter of greater than approximately 11 μm. Particles of the fly ash preferably each have a median diameter of greater than approximately 15 μm.

Overall, the low content of Portland cement preferably forms between approximately 6 wt % and approximately 12 wt % of the strain-hardening cementitious composite (i.e., a relatively low concentration), the ground scoria preferably has a concentration in the strain-hardening cementitious composite of between approximately 5 wt % and approximately 20 wt %, the fly ash preferably has a concentration in the strain-hardening cementitious composite of between approximately 32 wt % and approximately 33 wt %, the sand preferably has a concentration in the strain-hardening cementitious composite of approximately 23 wt %, the polyvinyl alcohol fibers preferably have a concentration in the strain-hardening cementitious composite of approximately 1.28 wt %, and the polycarboxylic ether-based superplasticizer preferably has a concentration in the strain-hardening cementitious composite of approximately 0.1 wt %.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The low cement content strain-hardening cementitious composite is a cement with a natural pozzolan replacing a portion of the Portland cement therein. The strain-hardening cementitious composite includes a cement mixture, fly ash, sand, a polycarboxylic ether-based superplasticizer, and reinforcing polyvinyl alcohol fibers. The cement mixture is formed from a mixture of low content of Portland cement and ground scoria as the natural pozzolan. As is well known in the art, scoria is a highly vesicular, dark colored volcanic rock which is commonly and easily found in volcanic lava fields, such as those in the Arabian Peninsula, along the Arabian shield within the eastern shore of the Red Sea.

The sand forms at least 22 wt % of the strain-hardening cementitious composite and is preferably in the form of sieved dune sand, having a silicon dioxide concentration of between approximately 80 wt % and approximately 90 wt %, and a feldspar concentration of between approximately 10 wt % and approximately 20 wt %.

The dune sand is sieved such that the sand grains have a median diameter of less than or equal to approximately 300 μm and, preferably, have a median diameter of approximately 200 μm. Particles of the Portland cement each preferably have a median diameter of greater than approximately 11 μm, and grains of the ground scoria each also have a median diameter of greater than approximately 11 μm. Particles of the fly ash preferably each have a median diameter of greater than approximately 15 μm.

Overall, the Portland cement preferably forms between approximately 6 wt % and approximately 12 wt % of the strain-hardening cementitious composite, the ground scoria preferably has a concentration in the strain-hardening cementitious composite of between approximately 5 wt % and approximately 20 wt %, the fly ash preferably has a concentration in the strain-hardening cementitious composite of between approximately 32 wt % and approximately 33 wt %, the sand preferably has a concentration in the strain-hardening cementitious composite of approximately 23 wt %, the polyvinyl alcohol fibers preferably have a concentration in the strain-hardening cementitious composite of approximately 1.28 wt %, and the polycarboxylic ether-based superplasticizer preferably has a concentration in the strain-hardening cementitious composite of approximately 0.1 wt %.

In order to prepare the strain-hardening cementitious composite, the Portland cement, ground scoria, fly ash and sand are mixed for a predetermined amount of time to produce a homogenized mixture. The homogenized mixture is then mixed with a predetermined amount of potable water, a viscosity modifying agent and a super absorbent polymer to produce a second mixture. This second mixture is mixed with the polyvinyl alcohol fibers to produce a final mixture, which is then cast in a mold for a predetermined amount of time.

Figure 1:
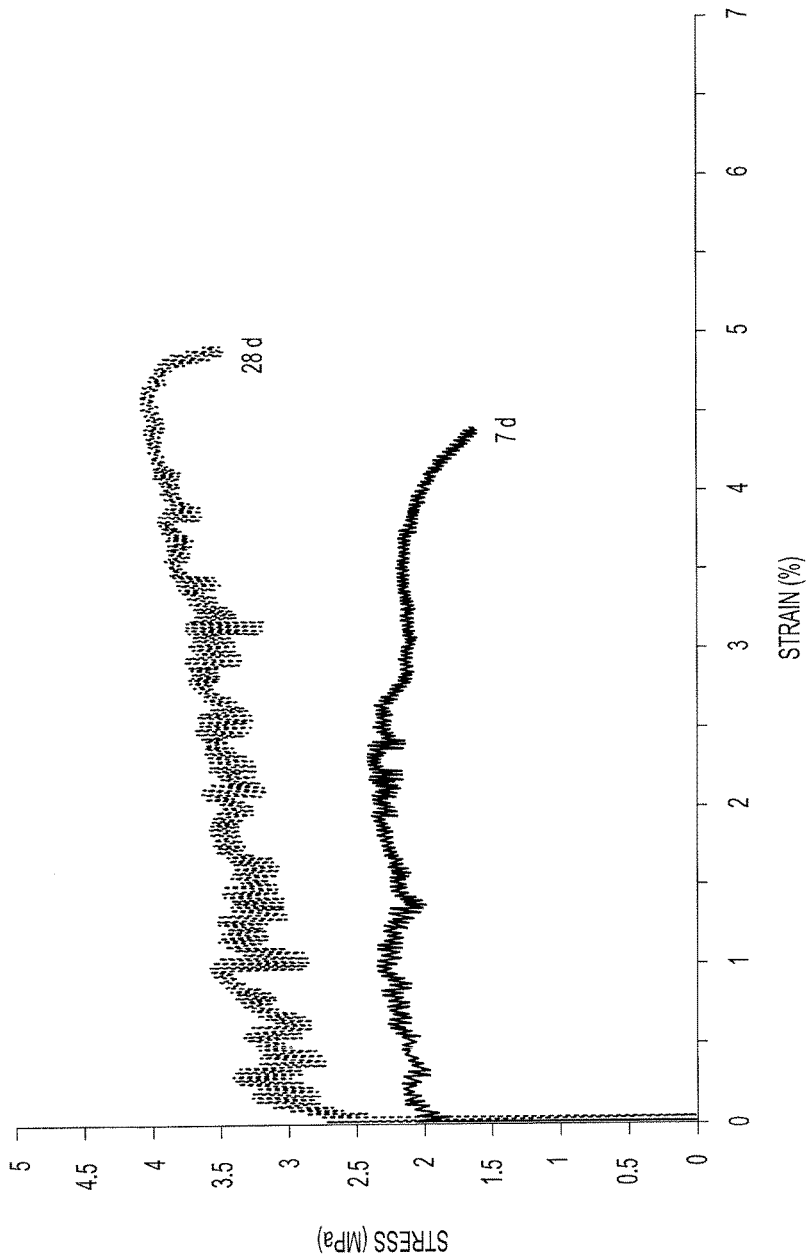
FIG. 1 is graph showing stress vs. strain for a strain-hardening cementitious composite prepared with a cement mixture having 50 wt % Portland cement and 50 wt % ground scoria, with strain capacities of the strain-hardening cementitious composite being shown for results after 7 days and after 28 days.
Figure 2:
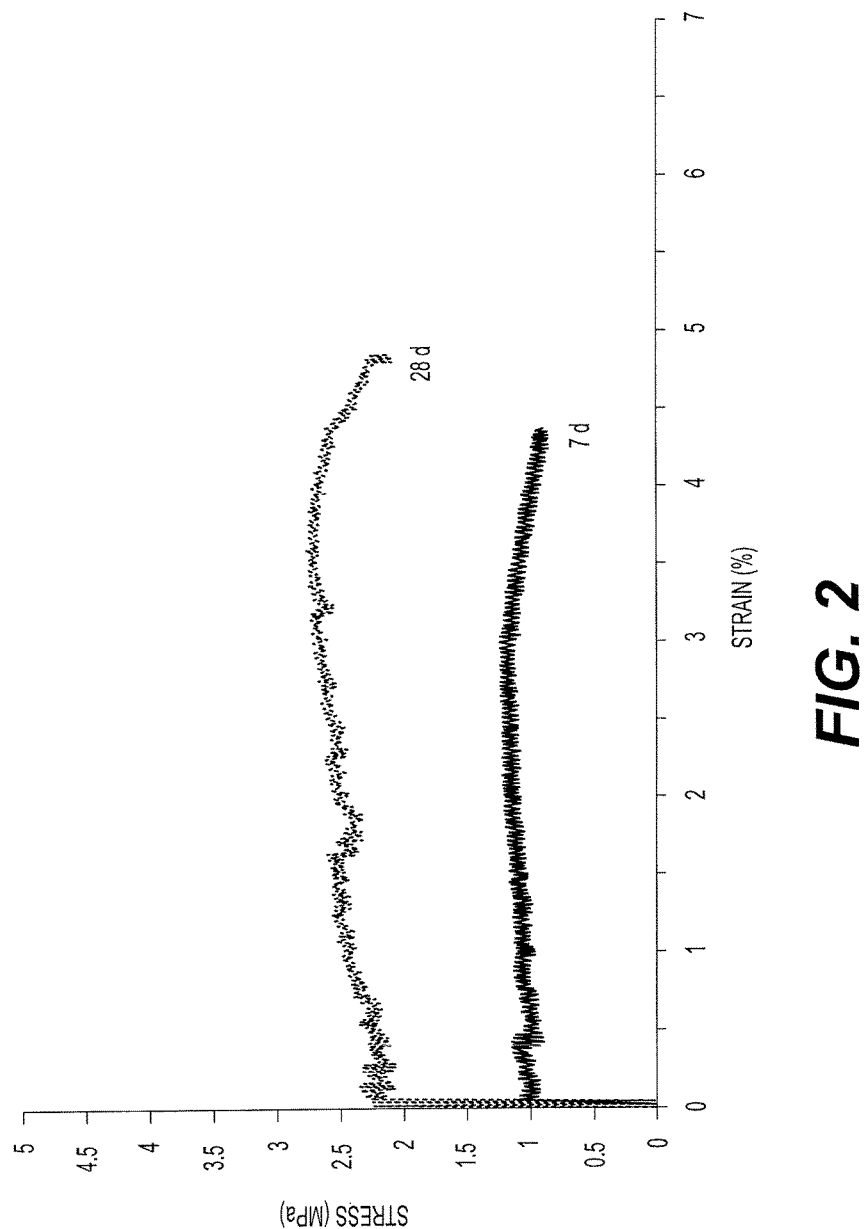
FIG. 2 is graph showing stress vs. strain for the strain-hardening cementitious composite prepared with a cement mixture having 25 wt % Portland cement and 75 wt % ground scoria, with strain capacities of the strain-hardening cementitious composite being shown for results after 7 days and after 28 days.
Figure 3:
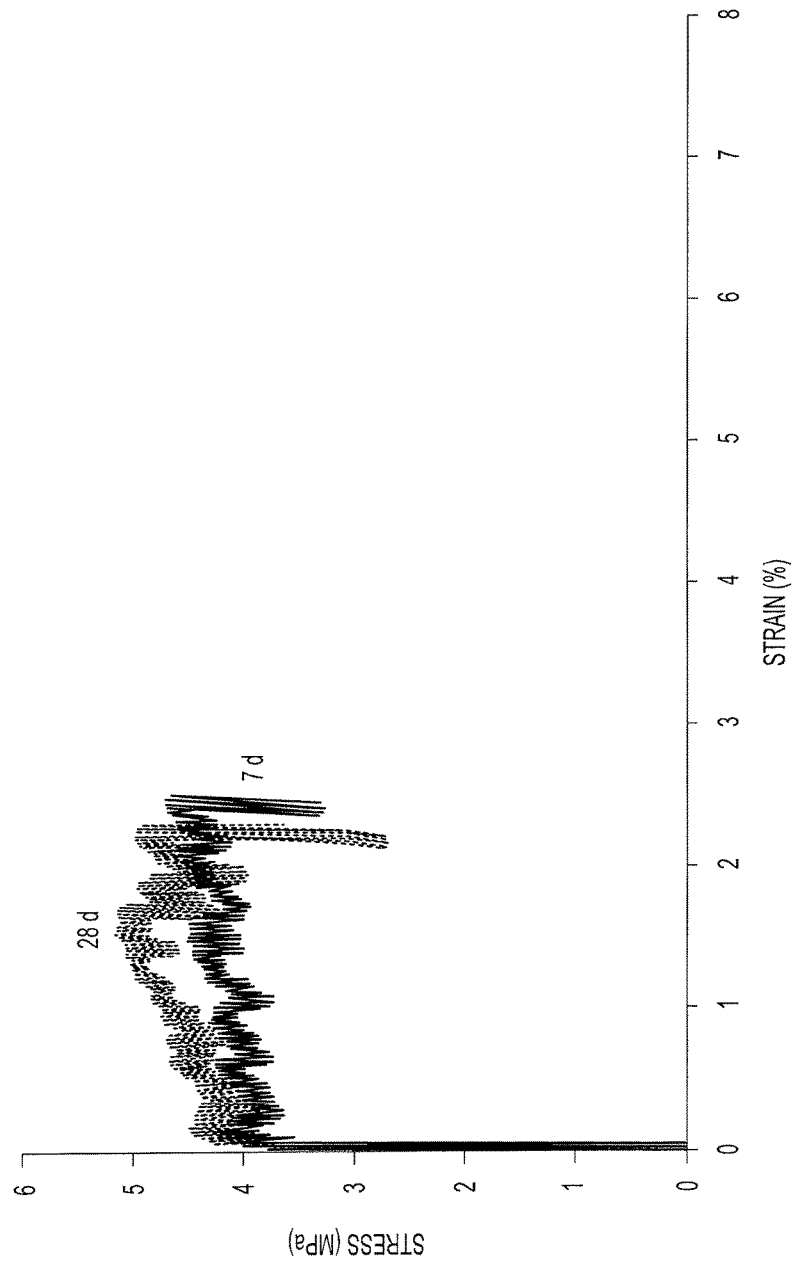
FIG. 3 is graph showing stress vs. strain for a conventional prior art cementitious composite prepared with only Portland cement and no ground scoria, with strain capacities of the strain-hardening cementitious composite being shown for results after 7 days and after 28 days.

In order to test the replacement of a large portion of the Portland cement (PC) with the natural pozzolans (NP) (i.e., the ground scoria), three separate composites were prepared, with the NP ranging from 0 wt % to 75 wt % of the cement mixture (i.e., the mixture of Portland cement with the ground scoria). FIG. 1 illustrates the tensile properties of the strain-hardening cementitious composite prepared with a cement mixture having 50 wt % Portland cement and 50 wt % ground scoria, and FIG. 2 illustrates the tensile properties of the strain-hardening cementitious composite prepared with a cement mixture having 25 wt % Portland cement and 75 wt % ground scoria. For purposes of comparison, FIG. 3 illustrates the tensile properties of a conventional cementitious composite prepared only with Portland cement and no ground scoria. The results in each of FIGS. 1-3 illustrate the strain capacities taken over both 7 days and 28 days.

As shown in FIGS. 1-3, the strain capacities of the 50 wt % NP sample and the 75 wt % NP sample show improvements of more than 4% when compared against that of the 0 wt % NP sample. Additionally, using a flow table test as an indicator for workability, the average spread-flow values of the 50 wt % NP sample and the 75 wt % NP sample each had a flow value higher than 200 mm. Further, cracking measurements were taken for each sample, with the results shown below in Table 1. The optimal replacement level with 50 wt % NP was found to provide a persisting strain hardening and tensile strength response which improved with time.

TABLE 1

Cracking Measurements

| | Measured Values for Each Sample | |
|---|---|---|
| | 0 wt % NP | 50-75 wt % NP |
| Crack spacing range (mm) | 0.55-3.73 | 0.75-1.8 |
| Crack opening range (μm) | 40-80 | <50 |
| Average crack spacing (mm) | 2.08 | 1.3 |
| Average crack opening (μm) | 50 | <50 |
| Number of cracks | <50 | >50 |

It is to be understood that the low cement content strain-hardening cementitious composite is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

It should be noted that this Project was funded by the National Plan for Science, Technology and Innovation (MAARIFAH), King Abdulaziz City for Science and Technology, Kingdom of Saudi Arabia, Award Number 12-ADV2591-02.

We claim:

1. A strain-hardening cementitious composite, consisting of:

between approximately 6% and 12% Portland cement by weight, wherein the Portland cement has a median particle diameter of greater than approximately 11 μm;

between approximately 5% and 20% ground scoria by weight, wherein the ground scoria has a median grain diameter of greater than approximately 11 μm;

between approximately 32% and 33% fly ash by weight, wherein the fly ash has a median grain diameter of greater than approximately 15 μm;

approximately 23% sand by weight, wherein the sand has a median grain diameter of approximately 200 μm;

approximately 1.28% polyvinyl alcohol fibers by weight; and approximately 0.1% polycarboxylic ether-based superplasticizer by weight.

2. The strain-hardening cementitious composite as recited in claim 1, wherein the sand comprises silicon dioxide having a concentration between approximately 80% and 90% of the sand by weight.

3. The strain-hardening cementitious composite as recited in claim 2, wherein the sand comprises feldspar having a concentration between approximately 10% and approximately 20% by weight of the sand.

* * * * *